3,251,861
DI- AND TRIEPOXIDE DERIVATIVES OF TRIVINYLCYCLOHEXANE

Werner Kirchhof and Kurt Kosswig, Marl, Kreis Recklinghausen, Germany, assignors to Chemische Werke Huls Aktiengesellschaft, Marl, Germany, a corporation of Germany
No Drawing. Original application July 6, 1960, Ser. No. 41,047. Divided and this application Nov. 14, 1962, Ser. No. 237,707
Claims priority, application Germany, July 10, 1959, C 19,378
2 Claims. (Cl. 260—348)

This application is a division of our application Serial No. 41,047, filed July 6, 1960, and now abandoned.

The present invention is concerned with diepoxide and triepoxide derivatives of 1,2,4-trivinylcyclohexane. The new compounds are useful for the production of epoxide resins, polyester and polymers. Moreover the new compounds are especially active as stabilizers for polyvinylchloride.

In the epoxidation of 1,2,4-trivinylcyclohexane it is possible, depending upon the reaction conditions selected to produce not only monoepoxides but also the di- and triepoxides.

Trivinylcyclohexane which readily may be made for example by thermal or catalytic isomerization of 1,5,9-cyclododecatriene may be used as the starting material. Organic peracids such as performic acid, peracetic acid or perbenzoic acid or the corresponding aldehydemonoperacylate may be used as the oxidizing agent. The peracid may also be formed from hydrogen peroxide during the course of the reaction. The epoxidation reaction may be carried out in the presence or absence of solvents such as benzene, acetone or chloroform. The appropriate reaction temperature depends upon the particular epoxide being formed and the particular procedure employed but generally is within the range from 20° to 80° C. The process generally is carried out by adding the peracid dropwise with stirring to the compound to be epoxidized. When using an acetaldehydemonoperacetate solution the reaction is carried out in vacuum so that the solvent and the acetaldehyde coming from the peracylate during reaction are distilled. The progress of the reaction is determined by titration of the peroxide content. After the end of the reaction the epoxide is recovered either by direct distillation of the reaction mixture or after washing out the acid. In the case of the mono and diepoxides mixtures of different isomers are obtained.

The invention is further described and illustrated by the following specific examples.

Example 1

2000 parts by weight of a 17.6% solution of peracetic acid in acetone are introduced with stirring into 800 parts by weight of trivinylcyclohexane over a period of 105 minutes while maintaining a temperature of 40 to 50° C. After 3½ hours the reaction mixture contains about 33 parts by weight and after 4½ hours about 32 parts by weight of peracid. At this point the reaction is interrupted and the solvent and acetic acid distilled under a vacuum obtainable by a water actuated aspirator. Distillation gives, in addition to unreacted trivinylcyclohexane, 346 parts by weight of monoepoxyethyldivinylcyclohexane having a boiling point of 55–65° at 0.3 torr ($n_D^{20}=1.4837-1.4856$) and 89 parts by weight of trivinyl- cyclohexanediepoxide having a boiling point of 84–95° C. at 0.3 torr ($n_D^{20}=1.4906$).

Example 2

40 parts by weight of a diepoxyethylvinylcyclohexane mixture was heated for 34 hours at 30° C. with 75 parts by weight of a 22.6% solution of peracetic acid in acetone. The resulting reaction mixture contains still about 5 parts by weight of peracetic acid. The reaction mixture is taken up in benzene and the resulting solution is washed with an aqueous soda solution and then dried and distilled. 6 parts by weight of unreacted diepoxyethylvinylcyclohexane distill at 105–115° C. at a pressure of 0.2 torr and 12 parts by weight of 1,2,4-triepoxyethylcyclohexane ($n_D^{20}=1.4937$) distill at 125–135° C. at the same pressure. The conversion is 85% and the yield is 33% of the theoretical yield.

Example 3

250 parts by weight of trivinylcyclohexane and 150 parts by weight of a 53% solution of peracetic acid in glacial acetic acid were mixed and stirred together for 20 hours at 20–25° C. and the resulting reaction mixture was worked up as in Example 2. 110 parts by weight of unreacted trivinylcyclohexane were recovered. 56 parts by weight of monoepoxyethyldivinylcyclohexane $$(n_D^{20}=1.4854)$$

distilled at 58–65° C. under a pressure of 0.3 torr.

Example 4

A mixture of 500 parts by weight of trivinylcyclohexane, 175 parts by weight of a 30% solution of hydrogen peroxide and 35 parts by weight of formic acid was stirred for 3 days at room temperature. 70% of the hydrogen peroxide were consumed. The aqueous phase was separated and replaced by 175 parts by weight of fresh hydrogen peroxide and 35 parts by weight of formic acid. After 3 more days the operation was repeated. After a total of 9 days the aqueous layer was separated and the organic phase was washed with a dilute water solution of sodium hydroxide, then dried over anhydrous sodium sulfate and there rectified. 234 parts by weight of unchanged trivinylcyclohexane, corresponding to a conversion of 53% and 152 parts by weight of monoepoxyethyldivinylcyclohexane (B.P. 57–64° C. at 0.5 torr, $n_D^{20}=1.4849-1.4858$) corresponding to a yield of 51% were recovered.

Example 5

19 parts by weight of diepoxyethylvinylcyclohexane were added dropwise with stirring to a solution of 15 parts by weight of perbenzoic acid in 400 parts by weight of chloroform. After 24 hours 90% of the perbenzoic acid was consumed. The resulting solution was washed with a dilute solution of sodium hydroxide in water and then dried over sodium sulfate and distilled. 11 parts by weight of 1,2,4-triepoxyethylcyclohexane ($n_D^{20}=1.4942$) distilled over at 125–30° C. at a pressure of 0.5 torr. The yield was 53% of the theoretical yield.

We claim:
1. Isomer mixture of diepoxides of 1,2,4-trivinylcyclohexane having a boiling point of 84–95 at 0.3 torr and a refractive index $n_D^{20}=1.4906$.
2. 1,2,4-triepoxyethylcyclohexane.

(References on following page)

References Cited by the Examiner

UNITED STATES PATENTS 2,887,465  5/1959  Hopff _____ 260—348
2,977,374  3/1961  Phillips et al. _____ 260—348

FOREIGN PATENTS 488,698  12/1952  Canada.
1,011,410  4/1952  France.

OTHER REFERENCES

Hendry et al., Brit. J. Pharmacol, 1951, vol. 6, pages 235–255 (pages 238 and 242 relied on).

WALTER A. MODANCE, *Primary Examiner*.

DUVAL T. McCUTCHEN, *Examiner*.